United States Patent

[11] 3,555,946

| [72] | Inventor | William L. Addis |
| --- | --- | --- |
| | | Glassboro, N.J. |
| [21] | Appl. No. | 852 |
| [22] | Filed | Jan. 6, 1970 |
| | | Division of Ser. No. 657,674, Aug. 1, 1967 |
| [45] | Patented | Jan. 19, 1971 |
| [73] | Assignee | Owens-Illinois, Inc. |
| | | a corporation of Ohio |

[54] SHEAR STACKER APPARATUS
6 Claims, 8 Drawing Figs.

[52] U.S. Cl. ................................................. 83/89,
83/94, 83/104, 83/106, 83/165
[51] Int. Cl. ...................................................... B65h 29/26,
B65h 29/60
[50] Field of Search............................................. 83/27, 23,
89—97, 104, 106, 165, 166

[56] References Cited
UNITED STATES PATENTS
1,923,937 8/1933 Krusp................................ 83/104X Primary Examiner—James M. Meister
Attorneys—John R. Nelson and Edward J. Holler ABSTRACT: The present invention relates to apparatus for scroll-shearing strips from a sheet of metal stock imprinted with coatings, such as blanked circular areas for the manufacture of metal caps from sheared strips. The sheets are successively sheared into multiple strips and the strips are oriented and fed to bins all in the same orientation. The feeding of the strips to the bins and orientation thereof is accomplished by gravity feed of the sheared strips by position of the shear point of the sheet to a corresponding conveyor means which automatically orients the strips it receives and dispenses the strips into a bin so that the strips are piled in all bins in like orientation.

INVENTOR.
WILLIAM L. Addis

INVENTOR.
WILLIAM L. Addis 3,555,946

1

SHEAR STACKER APPARATUS

The present application is a divisional of Ser. No. 657,674, filed Aug. 1, 1967, copending herewith.

The present invention relates to sheet shearing and stacking, and more particularly to apparatus for handling sheared sheets of metal in orienting the sheared strips into desired position in receiver bins or receptacles such that the plural sheared strips from a sheet are uniformly oriented for subsequent handling in their processing in manufacture of an article.

The invention has utility in the manufacture of metal closure shells. The present invention enables the use of a sheet of tinplate that is coated and lithographed over a series of circular areas each corresponding to a cap blank. The lithographed (or printed) sheets have the cap blanks in uniformly spaced rows extending laterally of the sheet. To conserve space, as will be hereinafter apparent, the rows of cap blanks are printed in a compacted, close order, staggered array, one row somewhat overlapping the next. The sheets are best handled with several rows of cap blanks printed thereon and prior to stamping out the individual circular cap blanks on a punch press, the sheets are cut into strips such that, for example, each strip has three adjacent, staggered rows of cap blanks. To conserve the utmost of space in the sheet, the adjacent rows, being staggered, actually overlap as much as possible, or to put it another way, the circular blank regions of the adjacent rows nearly nest adjacent each other. Therefore, in cutting the strips, the shear die is a double-edge scroll shear that cuts strips on a zigzag line passing around the adjacent blanks of two of the rows in the sheet so as to cutout strips without loss of any of the blanks of the sheet.

An object of the invention is to provide apparatus for automatically shearing the sheets into multiple strips, and feeding all the strips of each sheet to a receiver bin in a desired orientation so that the strips may thereafter be processed in further manufacture of articles therefrom.

A further object of this invention is to provide apparatus for handling multiple sheared strips from sheets and depositing each of the sheared strips in a desired receiving bin in oriented stacks therein.

A still further object of the invention is to provide means for automatically discharging trimmed scrap from each sheet and keeping said trimmed scrap metal separate from the strips.

The specific nature of this invention, as well as other objects and advantages thereof, will become apparent to those skilled in the art from the following detailed description, taken in conjunction with the annexed sheets of drawings, on which, by way of preferred example only, is illustrated a working embodiment of this invention.

ON THE DRAWINGS

The present invention in its preferred form, relates to handling of lithographed sheets of tin plate on which transverse rows of cap blanks are printed, coated, etc. for punching the circular areas from the sheet through the use of a punch press. The punched circular areas are handled through a series of dies and formed to a bottle cap or similar article.

The punch press for punching the circular areas from the strips were heretofore set up as double punch dies and each strip advanced intermittently through the press so that the die successively punches out the circles in each of the plural rows of the strip. The metal strips must be fed into the die-punch press machine in the same orientation. If the circular areas on each strip and all rows in a metal sheet are laid out along longitudinal aligned centers, and each row of the circular areas are on parallel lateral aligned centers, the orientation of the strips sheared from the strip is not especially a problem. However, much economy of metal is achieved when the circular areas of the cap blanks are laid out in staggered rows. In the present invention, a triple punch die may be used, because the strips have three rows of cap blanks laid out in them and the rows are compacted and staggered to conserve metal.

Figure 1:
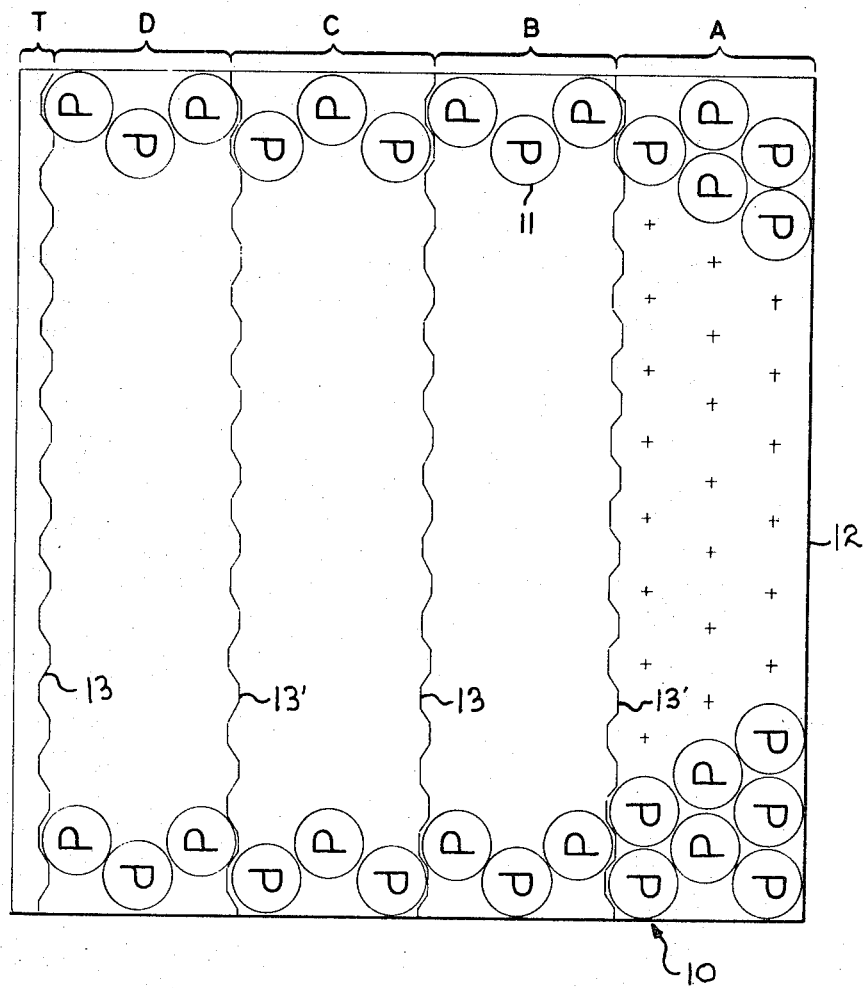
FIG. 1 is a plan view of a sheet of metal that is lithographed with plural rows of cap blanks for double-cut edge scroll shearing.
Figure 2:
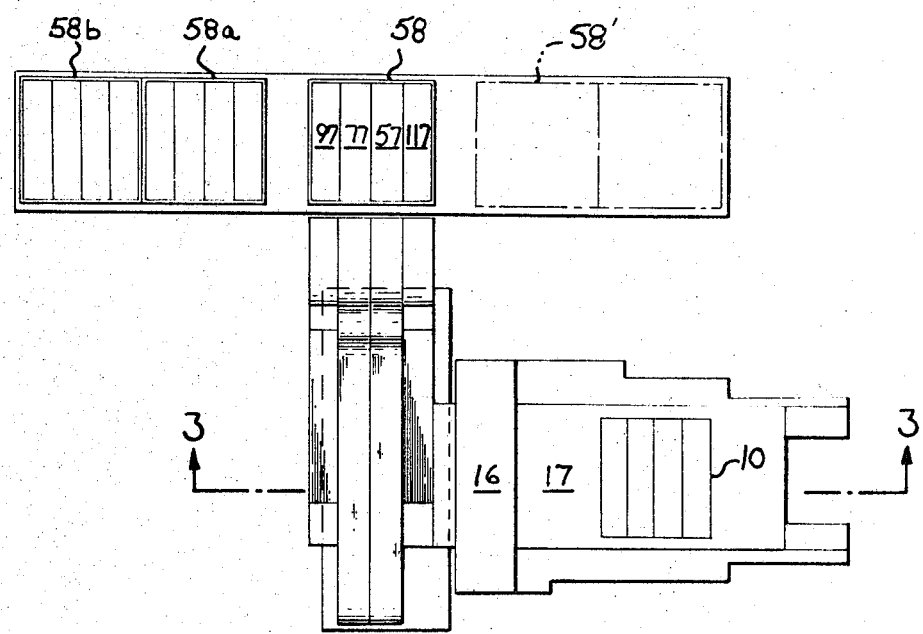
FIG. 2 is a plan view that is in part schematic, of the invention in which the sheets are fed to the shear press and cut into four strips that are handled by the apparatus of the invention to deposit the sheared strips in oriented fashion in the individual receiver bins.
Figure 3:
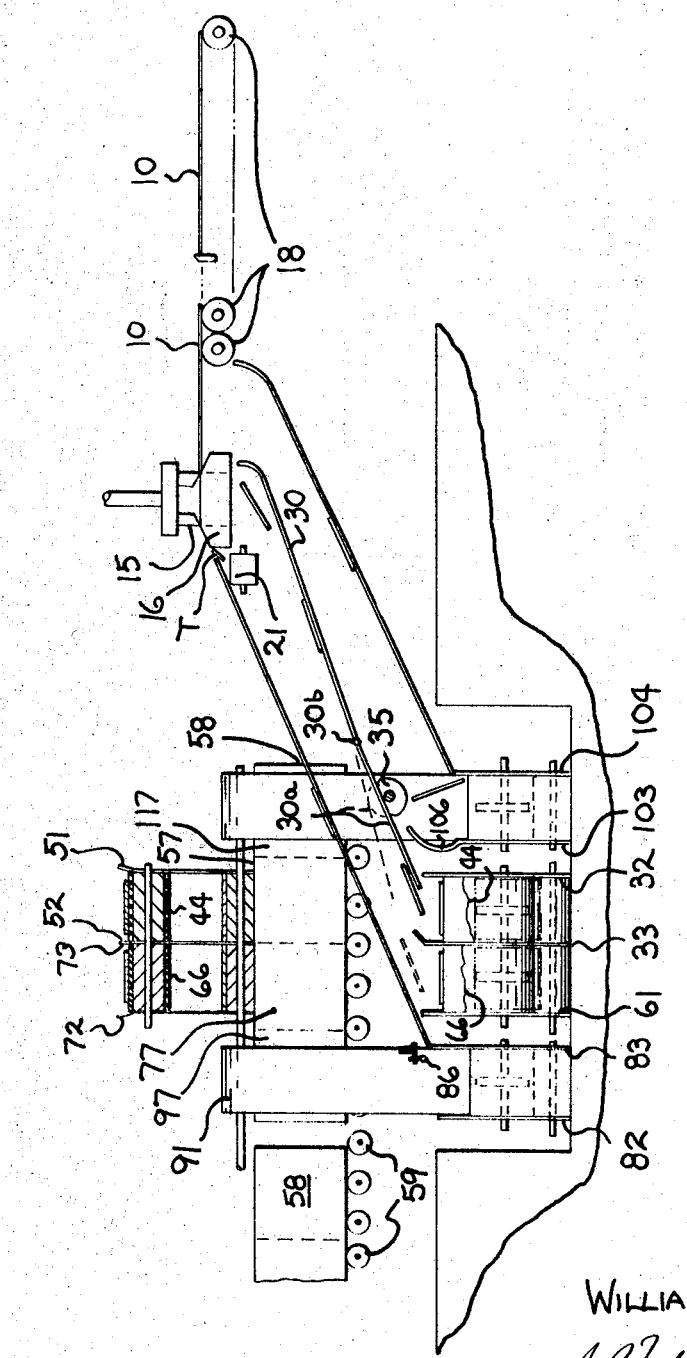
FIG. 3 is a sectional elevational view, in part schematic, taken along line 3—3 of FIG. 2.

This is shown on FIG. 1. The metal sheet 10 has various coatings or spot coatings applied to the underside of it. Lettering and decorative material is lithographed on the top surface of sheet 10 to form rows of cap blank circles 11. The rows extend along the lateral side 12 of sheet 10. To achieve economy in the layout, the circles 11 of the adjacent rows are staggered and nearly touching as in a nested relationship. If a straight line were drawn parallel to side 12 of the sheet and tangent to the circles of the first row, the line would intersect all the circles of the adjacent second row. Thus, when the sheet is sheared into plural strips for handling in the punch press, the shear line is scrolled, such as at lines 13 and 13' on sheet 10.

The layout of the cap blanks 11 in the sheet 10 illustrates a "triple die scroll" sheet. The invention is equally applicable to any odd multiple die layout where double-cut edge scroll shearing technique is used. The rows of cap blanks 11 have lithographed printing or decorating indicated by the letter P on FIG. 1. The printing in each of the rows is reversed from the other, i.e., alternate rows have the printing upside down from that of the next adjacent rows. In the double-cut edge scroll cut of the strips, the same forward edge of the strip should be used in feeding the strip to the press for punching out the cap blanks. This triple-die scroll sheet, when cut into triple-die scroll strips, indicated as A, B, C and D on FIG. 1, enables a 50 percent increase in production rate by use of the three die stamping press for removing the cap blanks from the strips. Prior presses were operated on two row strips, where each strip fed the press contained but two rows of cap blanks. The die of this stamping press was a double cavity die corresponding to the two rows. The present invention provides for triple die press by the formation of the three row, scroll sheared strips AD.

In forming the strips AD from sheet 10, a single die 14 and punch 15 are utilized on a shear press 16. Referring to FIGS. 2, 3, 4 and 5, the shear press 16 receives a succession of sheets 10 fed to it on the infeed conveyor 17 comprised of rolls 18, one or more of them being "live rolls" that are powered in a forward or CCW direction (FIG. 3) by suitable conventional drive means (not shown). As a part of the shear feed mechanism, the sheet 10 is stopped over the die 14 and the punch 15 is rapidly reciprocated. The cutting edges of the die 14 are shown in the perspectives views, FIGS. 6—8, the forward cutting edge 19 being a mirror image (reverse) of the contour of the trailing cutting edge 20. The punch 15 is correspondingly contoured to provide the cooperating shear surfaces. The edges sheared on the lateral (major) dimension of the strip at 13 and 13' are therefore correspondingly of a mirror image relationship to each other.

Figure 4:
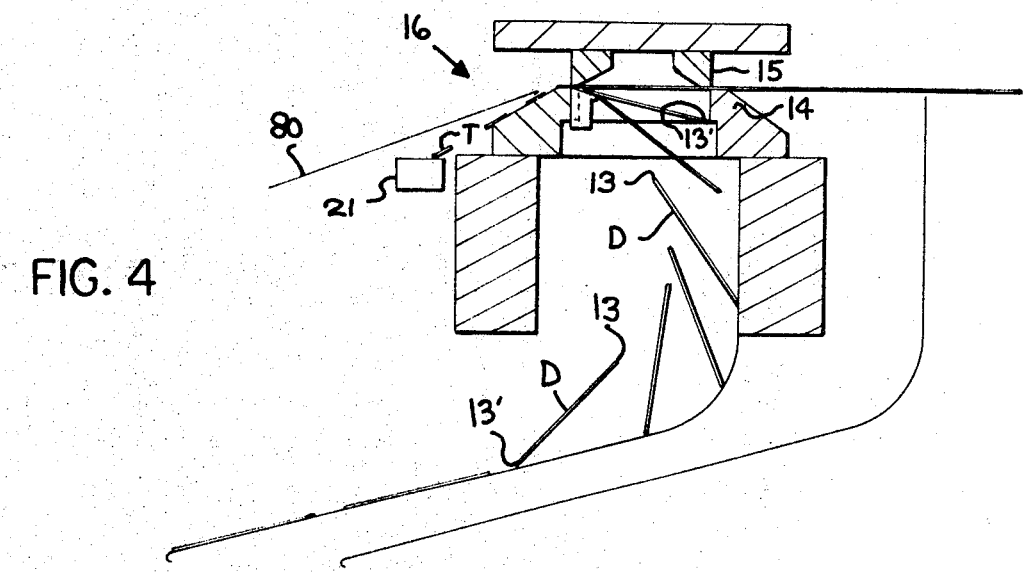
FIG. 4 is a sectional elevational view illustrating the step of making the first shear cut in a sheet and handling the resulting sheared strips.

As the sheet 10 is first fed into the shear press, it is stopped in a first position, as shown on FIG. 4. The forward portion of the sheet 10 marked T is a trim portion (FIG. 1) that extends over the leading edge of the die 14. As the shear 16 is operated, it cuts the trim T and the first scroll sheared strip D from the sheet. The trim T, being of small longitudinal dimension will fall in the space over the trim conveyor belt 21.

The conveyor 21 may be of the endless variety, suitably driven by known motor drives (not shown), or a gravity chute to convey the Trim T to a collection hopper (not shown). The first cut strip D will fall below the die and during the gravity fall invert itself with the printed side down (see FIGS. 4 and 7). Three strips A, B and C now remain in sheet 10 and are yet uncut.

The strip D in its inverted position is received on the sheet metal guide apron 30 extending from adjacent the far edge 20 of die 14 to a point adjacent a first receiver chute 31. This chute 31 has parallel vertical walls 32 and 33 and a downwardly sloped bottom surface 34. The top side of the one wall 33 has an inwardly sloped segment 33a which serves to deflect strips D into the receiver chute 31. The apron 30 has a hinged lower section 30a that pivots about the transverse axis 30b at the pivot pin connection between 30 and 30a. The underside of section 30a of the apron rests on a pair of spaced, parallel cams 35 and 36 rotatable with the shaft 37 extending under the apron. The end of shaft 37 has a sprocket 38 and drive chain 39, the latter being connected to a synchronous drive sprocket (not shown) on the shear press. As the press is driven to lower the punch 15 and cut the strip D, the cams 35, 36 are synchronized so that the strip D will slide down apron 30 while its lower section 30a is in the lowermost position. This feeds all of the strips D into the chute 31 with its lithographed surface down. As strips slide down surface 34 by gravity, they are engaged between a pair of nip rolls, the upper roll 40 being an idler roll and the lower roll 41 being driven by electric motor 42. The nip rolls 40 and 41 feed the strip D along the curved guide 43 and against the moving conveyor belt 44. This conveyor has a magnetized metal vertical backing element 45 that extends to the idler pulley 46 of the conveyor. The tinplate strip D will be carried vertically by the belt to an elevation of the other end pulley 53 and there at the conveyor curves from its vertical span into a horizontal span. As the strip D was picked up and carried on the belt 44, the outer surface of the strip is now the top lithographed surface, the same as when the strip D was sheared from the sheet 10. However, the scrolled shear line 13 that was the leading edge of strip D when the latter was sheared by the die (FIG. 4) is now the trailing edge of the strip. The strip D is next delivered to a metal gravity chute 50 having parallel vertical sides 51 and 52 and this chute delivers strips D onto the horizontal reach of conveyor belt 54. The belt 54 is reeved over end pulleys 55 and 56, either of which may be driven by conventional means (not shown) to deliver strips D off the end of the horizontal segment of belt 54 from where the strips each fall into a cell 57 of the receiver box 58. The box 58 is positioned stationary on the rollers 59 of a horizontal roller conveyor. As each box 58 fills with strips, it may be transported along the conveyor rolls 59 to a remote position awaiting movement to the punch press for the cap blanking operation.

Figure 5:
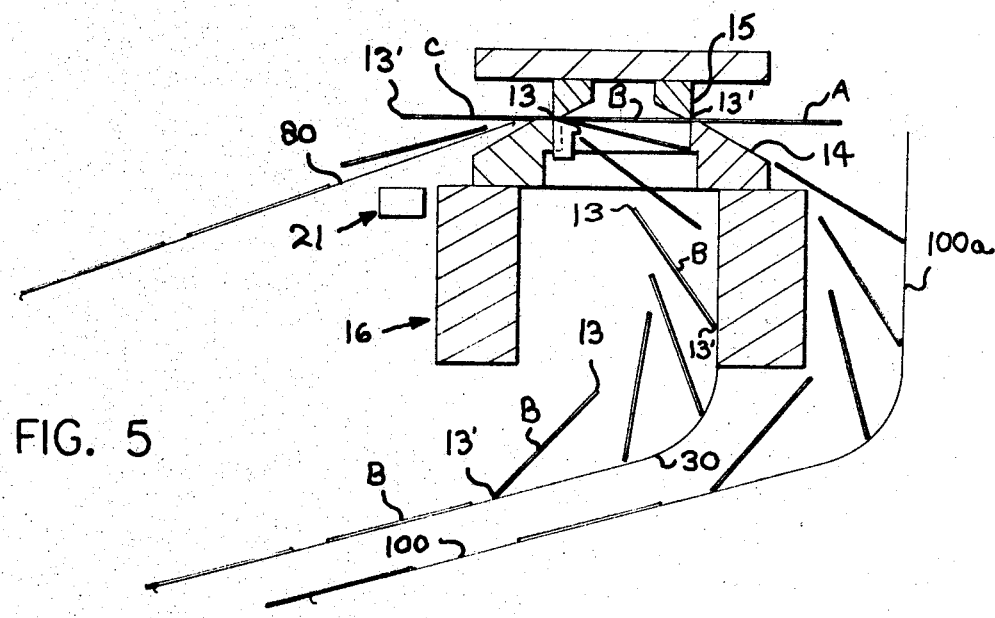
FIG. 5 is a sectional elevational view, similar to FIG. 4, but illustrating the step of making the second shear cut in the sheet and handling the resulting sheared strips.
Figure 7:
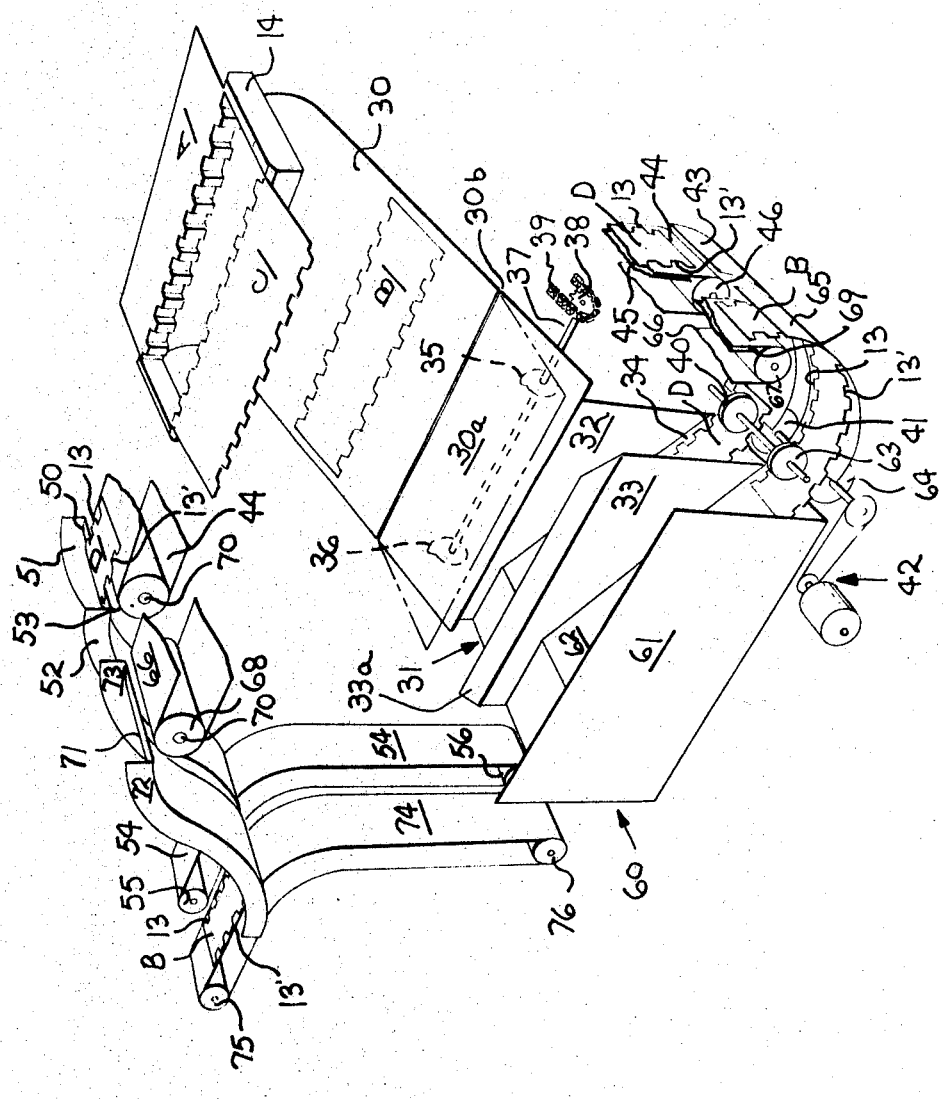
FIG. 7 is a front perspective view of an intermediate portion of the strip-handling apparatus.

After the shear has made its first cut, the remainder of sheet 10 advances to a position shown on FIGS. 5 and 7. In this position, strip B is centered over die 14, and the shear stroke now cuts the three strips C, B and A simultaneously. Still referring to FIGS. 5 and 7, strip B falls by gravity, in manner as did strip D, described earlier, and inverts itself so that scroll edge 13' is now forward and scroll edge 13 is rearward. The strip slides down apron 30, but timed with this second stroke of the shears, the apron segment 30a is raised by the cams 35, 36 to the phantom line position on FIG. 7. Adjacent the first receiver chute 31 is a similarly constructed second receiver chute 60 having a far vertical wall 61 parallel with the common wall 33 and a downwardly sloped bottom wall 62. The strip B will be guided between the nip rolls 63 and 64, the lower roll 64 being driven in common with roll 41. From nip rolls 63 and 64, strip B moves along arcuate guide 65 and onto the vertical reach of endless belt 66 that is reeved on end pulleys 67 and 68. The far pulley 68 provides the terminus of a horizontal span of the belt 66. The belt runs over a metal backing 69 that is magnetized to hold the tinplate strips on the belt principally on its vertical travel. The far end pulley 68 and 53 (of the adjacent conveyor) may be on a common shaft 70 driven by any conventional drive, such as an electric motor (not shown). As the strips B are delivered from belt 66, they are placed in a metal guide chute 71 with vertical sides 72 and 73 which delivers the strips onto a horizontal belt 74 running over end pulleys 75, 76. The belt 74 feeds strips B into a cell 77 of the bin 58 so that the lithographed surface is facing up and scroll edge 13' is forward. The strips D and B now reside in adjacent cells of the bin, each of the strips in the bins being of like orientation edgewise and top surface orientation.

Referring to FIGS. 5 and 7 briefly, the second stroke of the shear also cuts strips C and A. Strip C falls forward from the die 14 and onto a downwardly sloped apron 80. The strip C is oriented with its scroll edge 13' forward and scroll edge 13 rearward.

Figure 8:
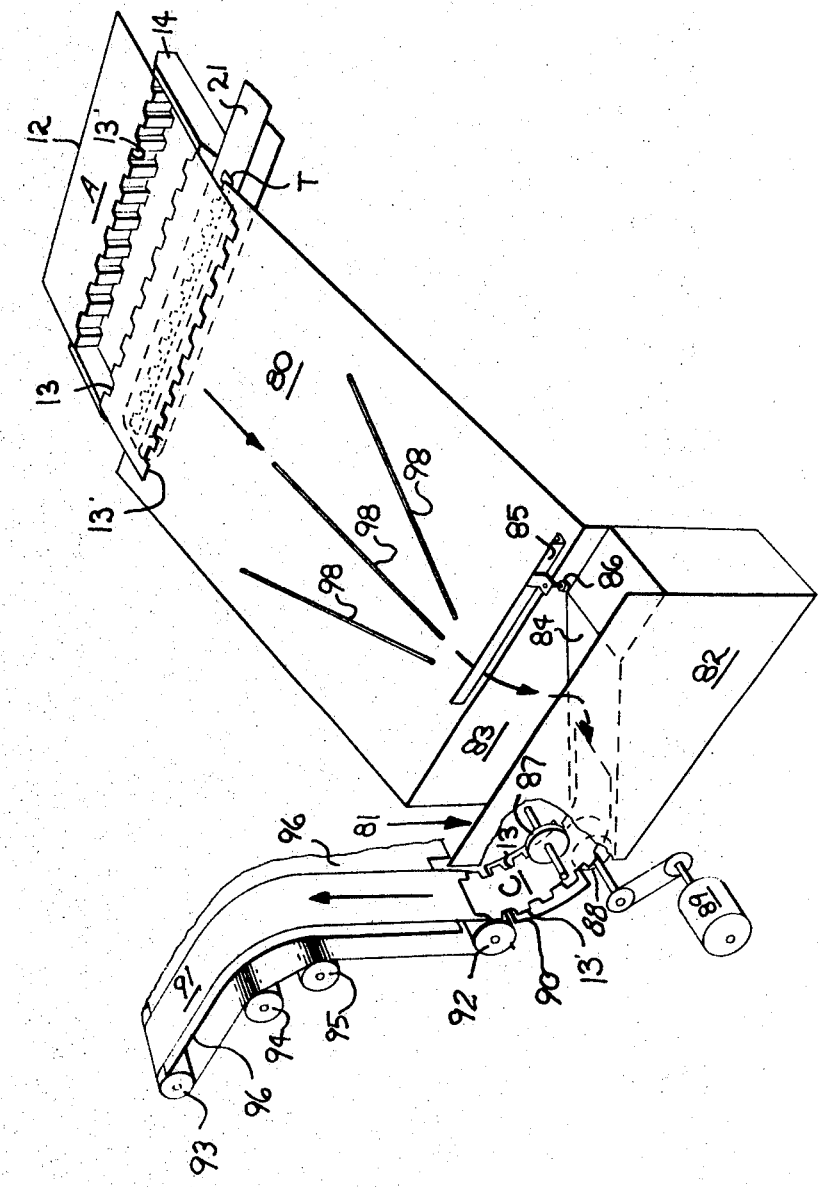
FIG. 8 is a front elevational view of a top portion of the strip-handling apparatus.

Referring to FIG. 8, the strip C slides down apron 80 into a downwardly sloped chute 81 having vertical sides 82 and 83 and sloped bottom 84. The side 83 is fastened to the terminal end of apron 80. An angle support bar 85 is mounted on the mechanism at the sides of apron 80 (not shown) and is spaced above the apron 80 enough to allow strips C to pass underneath. The bar 85 supports a downwardly extending rubber bumper 86 that deflects the strips C into the chute 81. As the strip slides down the bottom wall 84, it enters nip rolls 87 and 88, the lower roll 88 being driven by a motor means 89. The rolls 87 and 88 feed the strips along the arcuate guide 90 onto the conveyor belt 91 that is endlessly driven over end pulleys 92 and 93 and intermediate idlers 94 and 95. The upper reach of the belt 91 runs over a curved metal guide 96 that is magnetized to hold the tinplate strips on the conveyor belt 91. At the end of the conveyor, the strips C are delivered to a cell 97 of the bin 58 such that the lithographed surface is up and the scroll edge 13' is forward and edge 13 is rearward. This is the same orientation as strips B and D have in the box 58.

As seen on FIG. 8, divergent raised slide rods 98 are attached on the top surface of apron 80 to reduce friction on the strips sliding to the chute 81. This feature may be employed on the other aprons described herein if their slope is insufficient to give a desired delivery of the strips into the various chutes, or an increase in speed of delivery of the strips is needed.

Figure 6:
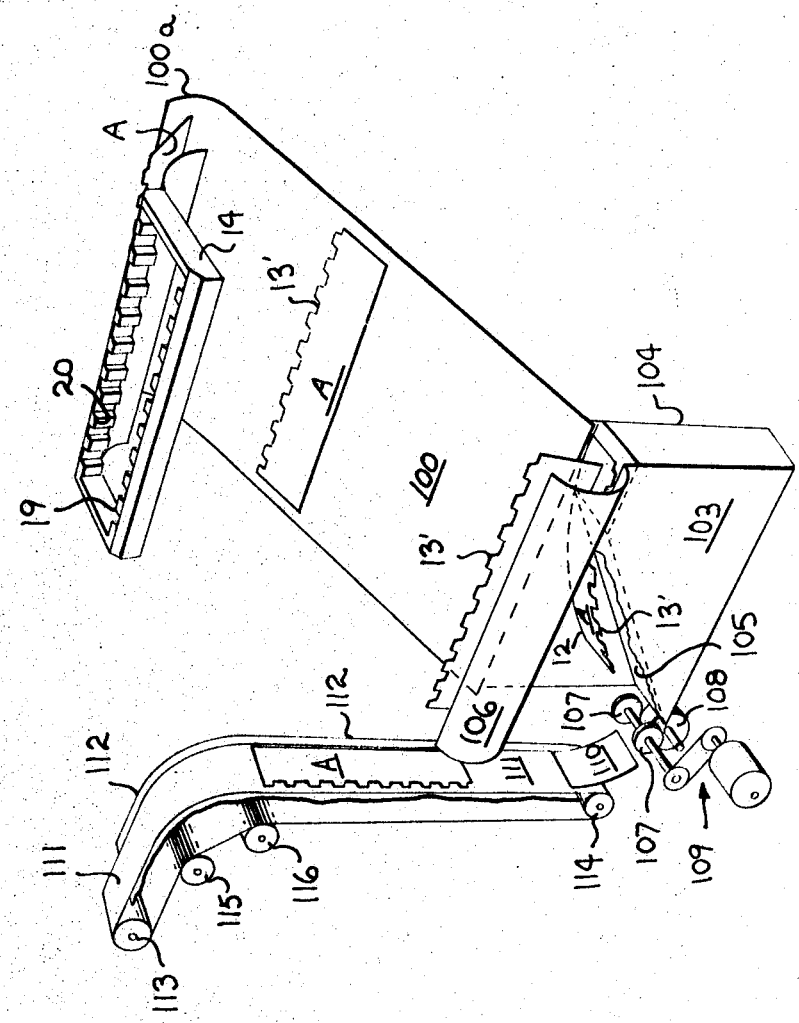
FIG. 6 is a front perspective view of a lower portion of the strip-handling apparatus.

Referring again to FIGS. 5 and 8, the rearward strip A is also sheared on the second stroke of the punch 15. FIG. 6 illustrates the handling of the strip A. An apron 100 is disposed as the bottommost apron of the three described, and it has a curved end 100a that receives, deflects and causes the strip A to be inverted with the lithographed surface down. The rear edge 12 of the sheet is forward and the scroll edge 13' is facing to the rear. At the lower end of apron 100 is a vertical chute structure 104 that is comprised of the parallel, vertical walls and the inclined bottom wall 105. An arcuate guide 106 is fastened on the upper end of vertical wall 103 and serves to flip the strip A over and return its lithographed surface uppermost. The scroll edge 13' will now be facing forward. As the strip A slides down the incline 105, it enters the nip rolls 107, 108; the upper rolls 107 being driven by an electric motor drive 109. Beyond the rolls 107, 108 is an upwardly curved metal deflector 110 which extends adjacent the vertical span of the endless conveyor belt 111. This belt runs in part over magnetized metal support plate 112 contoured to include the vertical leg and horizontal leg of the conveyor for the tinplate. The belt also extends around end pulleys 113 and 114 and two underside idler pulleys 115 and 116. One of the end pulleys, such as 114, is powered by drive means (not shown) preferably common with the other conveyor belts 91, 74 and 54. As the strips A reach the turn of the belt 111, they are similarly fed lengthwise into a cell 117 in the bin 58. The strips A are thus oriented therein the same as the strips B, C and D, described earlier; except, of course, the trailing edge 12 of the strip A is not a scroll cut edge. This is not important because the strips inclusive of strips A, are registered in the punch press for stamping out the cap blanks according to the scroll edge 13'.

As a bin 58 is filled, an empty bin 58' (phantom outline in FIG. 2) is advanced in line with the four conveyors discharging the strips and the filled bins are moved to the position indicated at 58a and 58b on the skate wheel conveyor support for the bins. The process of shearing sheets to strips and handling them may be carried out continuously and automatically in accordance with the above-described technique in shearing and handling one of the sheets 10.

While embodiments of the present invention have been herein specifically described, other embodiments and variations may occur to those skilled in the art after a knowledge of the disclosure herein, and it is desired to include within the scope of a patent granted hereon all such embodiments and variations and more particularly as comprehended by the appended claims.

I claim:

1. Apparatus for shearing and handling metal strips from master sheets which include multiple rows of circular article blanks imprinted on at least one surface, comprising a shear means for receiving the master sheets and feeding each through the shear means for cutting the sheet into plural strips, each strip containing multiple rows of said article blanks thereon, a first conveyor means adapted to receive the first and third most forward strips cut from each master sheet, said conveyor means extending to a lateral delivery zone, a receiver bin at said delivery zone supported to receive strips in plural piles, said conveyor means including means for holding said strips thereon at least during part of their movement thereon with said conveyor, said conveyor means having an overhead segment in which the strips are turned end-for-end for delivery to the receiver bin, a second conveyor means adapted to receive the second most forward strip cut from the master sheet, said conveyor delivering the strips at a terminal end thereof and including means for holding the strips thereon for at least a portion of the movement with this conveyor, said second conveyor means extending to the delivery zone for delivery of strips to the receiver bin, a third conveyor means for receiving the fourth most forward strip cut from said master sheet, said conveyor means extending to the delivery zone and including means for holding strips thereon at least during a portion of their movement with said conveyor, said third conveyor means including means for forwardly inverting each of said fourth strips while on the conveyor and prior to their being held by the conveyor.

2. The apparatus defined in claim 1, wherein the shear means on an initial stroke on each master sheet forms a forward marginal trim strip, and means disposed beneath the shear means to receive the trim strip and separate it from the other strips cut from said sheet.

3. The apparatus defined in claim 1, wherein the means holding the strips on the first, second and third conveyor means, respectively, comprise a magnetized backing plate at the back surface of a moving element of each said conveyor means magnetically holding metal strips against the opposite surface of said moving elements as they pass over the backing plates.

4. The apparatus defined in claim 3, wherein each of said conveyor means includes a pair of rotatable nip rollers for engaging strips and moving them into contact with the moving element thereof of the respective conveyor means, and drive means connected to rotate at least one said pair of rollers.

5. The apparatus defined in claim 1, wherein the third conveyor means includes a downwardly sloped apron, a lateral chute disposed below the apron at its terminal end, the chute having a downwardly sloped guide surface, a concavely curved lateral guide element disposed opposite the terminal end of said apron and spaced outwardly therefrom such that the strips falling from the terminal end of said apron to the sloped guide surface are tumbled forwardly end-for-end to invert them, and said curved guide element limits forward tumbling movement of the strips as they are fed to the lateral chute.

6. The apparatus defined in claim 1, wherein the first conveyor means comprises a downwardly sloped apron extending from beneath the shear means, a hinged end segment on said apron, rotatable cam means supporting said hinged end segment, a pair of parallel side-by-side downwardly sloped lateral chutes disposed beneath the terminal end of said hinged segment of the apron, and means for rotating said cam means for moving said hinged segment of the apron between positions for distributing strips conveyed over the apron of said lateral chutes.